US008194832B2

(12) United States Patent
Lohr

(10) Patent No.: US 8,194,832 B2
(45) Date of Patent: Jun. 5, 2012

(54) METHODS, SYSTEMS AND DEVICES FOR PROVIDING VOICE MAIL CALLER IDENTIFICATION FOR DISPLAY ON A TELEPHONE

(75) Inventor: Jonathan Charles Lohr, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1511 days.

(21) Appl. No.: 11/675,709

(22) Filed: Feb. 16, 2007

(65) Prior Publication Data

US 2008/0200151 A1 Aug. 21, 2008

(51) Int. Cl.
*H04M 15/06* (2006.01)

(52) U.S. Cl. ................................ 379/142.06; 379/88.12

(58) Field of Classification Search .......... 379/69–88.28
See application file for complete search history.

(56) References Cited

U.S. PATENT DOCUMENTS 5,283,818 A * 2/1994 Klausner et al. ........... 379/88.25
5,568,540 A * 10/1996 Greco et al. ............... 379/88.25
5,875,232 A * 2/1999 Wolf .......................... 379/88.19
5,930,700 A * 7/1999 Pepper et al. .............. 455/435.3
6,590,965 B1 7/2003 Poole et al.
6,888,927 B1 * 5/2005 Cruickshank et al. ...... 379/88.11
6,970,906 B1 * 11/2005 Parsons et al. ................ 709/204
7,142,646 B2 * 11/2006 Zafar et al. ................. 379/88.17
7,623,850 B1 * 11/2009 Garg et al. ..................... 455/417
7,688,954 B2 * 3/2010 Gatzke et al. .............. 379/88.21
2002/0154745 A1 10/2002 Shtivelman
2005/0281394 A1 12/2005 Lew et al.
2006/0182248 A1 * 8/2006 Smith et al. .............. 379/201.01
2008/0075244 A1 * 3/2008 Hale et al. .................. 379/88.13
2008/0080687 A1 * 4/2008 Broms ..................... 379/142.02

FOREIGN PATENT DOCUMENTS

WO WO 98/45383 A1 10/1998
WO WO 2005/027485 A1 3/2005
WO WO 2005027485 A1 * 3/2005

OTHER PUBLICATIONS

GSM 03.38 V7.1.0 (Mar. 1999), *Digital cellular telecommunications system (Phase 2+); Alphabets and language-specific information*, cover page, pp. 6, 8 (1999).
GSM 03.40 V7.1.0 (Nov. 1998), *Digital cellular telecommunications system (Phase 2+); Technical realization of the Short Message Service (SMS); Point-to-Point (PP)*, cover page, pp. 55, 61-64, 75 (1998).
Notification of Transmittal of the International Search Report and the Written Opinion of the International Searching Authority, or the Declaration, International Search Report, Written Opinion of the International Searching Authority, PCT/US2007/020726, Mar. 14, 2008.
U.S. Appl. No. 11/669,260, filed Jan. 31, 2007, Entitled *Device and Method for Providing and Displaying Animated SMS Messages*, 51 pages.

* cited by examiner

*Primary Examiner* — Simon Sing
*Assistant Examiner* — Assad Mohammed
(74) *Attorney, Agent, or Firm* — Myers Bigel Sibley & Sajovec

(57) ABSTRACT

Caller identification information is transmitted from a voice mail server to a telephone in response to receiving a voice mail message for the telephone at the voice mail server, and independent of receiving a request from the telephone to access the voice mail server. Caller identification information for the voice mail message may thereby be provided as a notification that the voice mail message was received at the voice mail server. Related methods, systems and devices are disclosed.

10 Claims, 4 Drawing Sheets

METHODS, SYSTEMS AND DEVICES FOR PROVIDING VOICE MAIL CALLER IDENTIFICATION FOR DISPLAY ON A TELEPHONE

FIELD OF THE INVENTION

This invention relates to telephone communications systems, methods and devices, and more particularly to voice mail systems, methods and devices.

BACKGROUND OF THE INVENTION

Voice mail systems, methods and devices are widely used in wireless and wireline telephone communications systems. As is well known to those having skill in the art, a voice mail system includes a voice mail server that can comprise one or more interconnected computers, wherein voice messages are stored and greetings, prompts and the messages themselves are provided to telephones. Voice mail systems typically display an icon or message on a telephone to indicate that one or more voice mail messages are waiting. Moreover, many voice mail systems provide some information about the call, along with playback of the stored message. For example, a time of receipt of the voice mail message may be provided.

Caller identification (caller ID) information also may be provided with a forwarded voice mail message, as described in U.S. Pat. No. 6,590,965 to Poole et al. entitled Enhanced Voice Mail Caller ID. As stated in the Abstract of this patent, the telephone network is adapted to supply name and number information to a voice mail system with a forwarded call. The voice mail system stores the name and number type caller ID information in association with the subscriber's mailbox. The system may store this information even if the caller does not actually deposit a voice mail message. Later, while the subscriber reviews the mailbox contents, the system offers a verbal announcement of the name and number. A central office switching system may query a line identification database to obtain the name for a caller ID service to the customer premises, in which case, that switching system forwards the name and number to the voice mail system with the forwarded call. In an alternative embodiment, the voice mail system launches the query and receives the name in a response, through the interoffice signaling network.

SUMMARY OF THE INVENTION

Some embodiments of the present invention provide voice mail methods that comprise transmitting caller identification information from a voice mail server to a telephone, in response to receiving a voice mail message for the telephone at the voice mail server and independent of receiving a request from the telephone to access the voice mail server. Caller identification information for the voice mail message may thereby be provided as a notification that the voice mail message was received. In other embodiments, the voice mail message itself is then transmitted from the voice mail server to the telephone in response to a request from the telephone, and subsequent to transmitting the caller identification information from the voice mail server to the telephone.

In some embodiments, the caller identification information comprises a telephone number that is associated with the voice mail message for the telephone. The voice mail message may be transmitted from the voice mail server to the telephone in response to a request from the telephone to access the voice mail message and/or a request from the telephone to access all voice mail messages.

In some embodiments, the caller identification information may be transmitted from the voice mail server to the telephone by transmitting a text message such as a short message service message, a wireless application protocol push message and/or a Session Initiation Protocol message that includes therein the caller identification information. Other standards-based and/or proprietary protocols may be used to transmit the caller identification information.

In other embodiments of the present invention, caller identification information for a voice mail message for a telephone is received at the telephone from a voice mail server. An identification of the caller that is based upon the caller identification information is then displayed at the telephone. Thereafter, the voice mail message may be played at the telephone in response to selection of the identification of the caller that is displayed at the telephone and/or in response to selection of a voice mail play function at the telephone.

In some embodiments, in order to display an identification of the caller that is based upon the caller identification information, a stored phone book may be accessed to determine if an identification of the caller is present that corresponds to the caller identification information. The identification of the caller is then displayed if the identification of the caller is present. Thus, for example, a caller name, picture or other identification may be displayed instead of or in addition to the caller's telephone number. In other embodiments, the caller identification information itself, such as the caller's telephone number, may be displayed if the identification of the caller is not present.

In some embodiments, the identification of the caller is displayed by displaying a pop-up message including the identification of the caller in response to receipt of the caller identification information and independent of receipt of a user request at the telephone to access voice mail. In other embodiments, an identification of the caller is displayed in response to receipt of a user request at the telephone to access voice mail. The caller identification may be displayed as part of a narrative message and/or a listing that includes the identification of the caller. Moreover, the voice mail message may be played at the telephone in response to selection of the identification of the caller from the narrative message and/or from the listing.

It will be understood by those having skill in the art that embodiments of the present invention have been described above in terms of methods of transmitting caller information from a voice mail server to a telephone, and methods of receiving and processing caller identification information at the telephone. However, analogous systems for transmitting caller identification information from a voice mail server to a telephone and analogous systems for receiving and processing the caller identification at the telephone may also be provided according to other embodiments of the invention. Moreover, other embodiments of the invention provide analogous voice mail servers and telephones.

DETAILED DESCRIPTION

Figure 1:
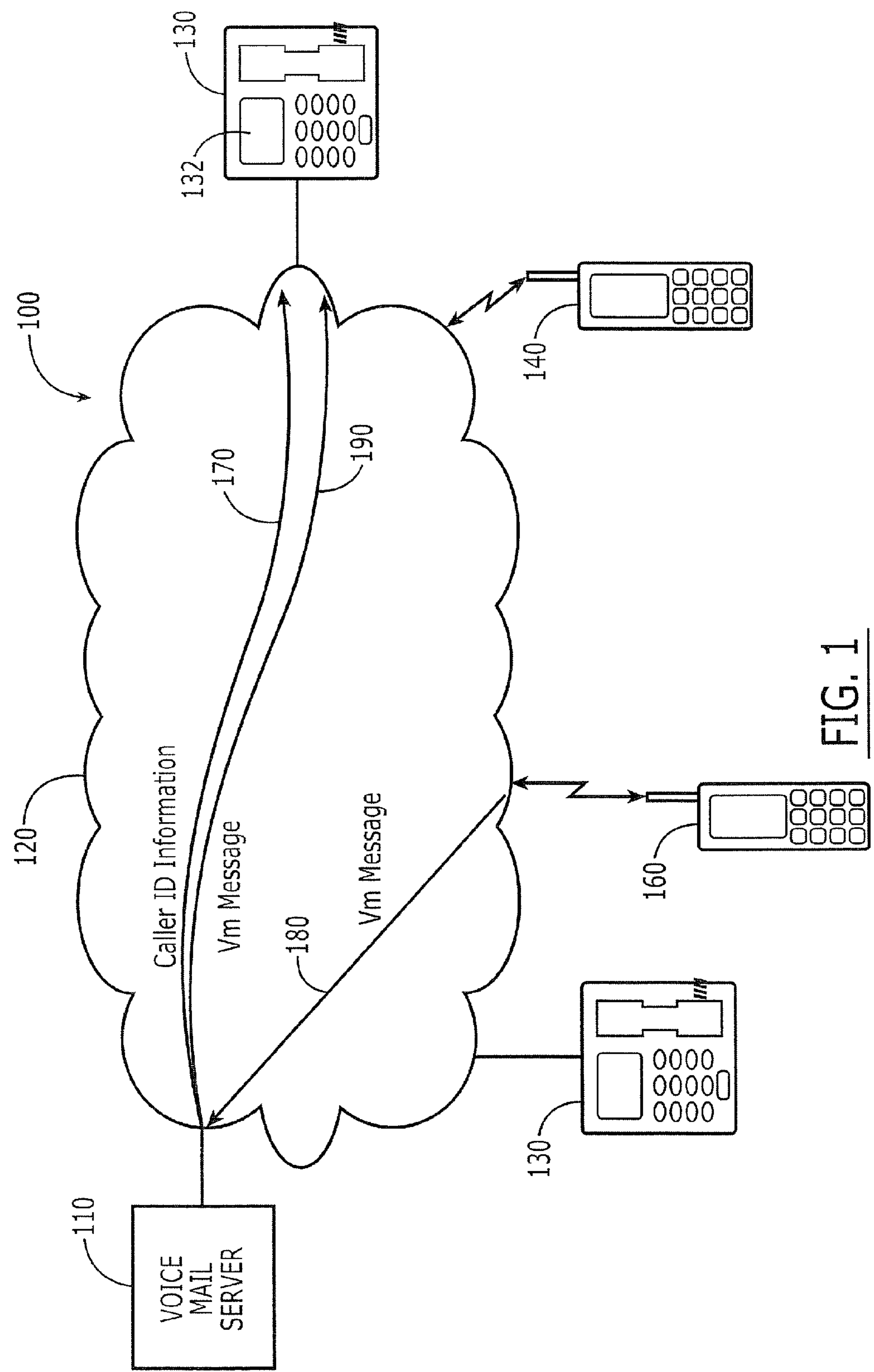
FIG. 1 is a block diagram of voice mail systems, methods and devices according to various embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" (and variants thereof) when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" to another element/step (and variants thereof), it can be directly responsive to the other element/step, or intervening elements/steps may be present. In contrast, when an element/step is referred to as being "directly responsive" to another element/step (and variants thereof), there are no intervening elements/steps present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another.

The present invention is described below with reference to block diagrams and/or flowchart illustrations of methods, apparatus (systems and/or devices) and/or computer program products according to embodiments of the invention. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act as specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate or transport the program for use by or in connection with the instruction execution system, apparatus, or device.

The computer-usable or computer-readable medium may be, for example but not limited to, an electronic, magnetic, optical, electromagnetic or semiconductor system, apparatus or device. More specific examples (a non-exhaustive list) of the computer-readable medium would include the following: a portable computer diskette, a random access memory (RAM), a read-only memory (ROM), an erasable programmable read-only memory (EPROM or Flash memory), and a portable optical and/or magnetic media, such as a flash disk or CD-ROM.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

As used herein, the term "telephone" includes both wireless and wireline telephones, as long the telephone includes a display that can be used to display caller identification information. Accordingly, wireline phones, such as Plain Old Telephone Systems (POTS) or Voice-over Internet Protocol (VoIP) phones with a single line or multi-line display, and wireless telephones are included. Moreover, as used herein, the term "telephone" also includes a multi-function device that includes telephone functions among its functionality. Accordingly, for example, a wireless telephone can include cellular and/or satellite radiotelephones; Personal Communications System (PCS) terminals that may combine a radiotelephone with data processing, facsimile and/or data communications capabilities; Personal Digital Assistants (PDA) that can include a radio frequency transceiver and a pager, Internet/intranet access, Web browser, organizer, calendar and/or a global positioning system (GPS) receiver; and/or conventional laptop and/or palmtop computers or other appliances, which include a radio frequency transceiver, for wireless data communications.

As is well known to those having skill in the art, a telephone generally includes a wired and/or wireless transmitter, a wired and/or wireless receiver and a user interface that includes a display, a microphone and a speaker (loudspeaker and/or earspeaker). A controller also is provided to control the operation of the various components of the telephone. Many other components may also be provided based on the functionality that is provided by the telephone. The general design and operation of telephones are well known to those having skill in the art and need not be described further herein. Moreover, voice mail systems have become ubiquitous for use with both wireless and wireline telephones. Accordingly, the general design and operation of conventional voice mail systems need not be described in detail herein.

Some embodiments of the present invention transmit caller identification from a voice mail server to a telephone in response to receipt of a voice mail message for the telephone at the voice mail server and independent of receiving a request from the telephone to access the voice mail server. The caller identification also may be transmitted independent of transmitting the voice mail message itself from the voice mail server to the telephone. Accordingly, caller identification is "pushed" to the telephone as part of the notification, rather than "pulled" by the telephone in response to playing the voice mail message. Caller identification information for the voice mail message may thereby be provided as a notification that the voice mail message was received at the voice mail server. The caller identification information, such as a caller telephone number, or an identification of a caller, such as a name or picture of the caller, may then be displayed at the telephone prior to playing the voice mail message. A caller identification may also be provided at the beginning of and/or during playback of the voice mail message.

Current voice mail telephone technology generally builds on the "answering machine" model, in the sense that users of the technology are notified that they have a message or messages, and the messages generally are time tagged. However, the user generally must listen to the message to determine who called. Even home and commercial Voice-over Internet Protocol (VoIP) services appear to provide only notification of voice mail without indicating who called. Caller information may be available via email or a Web interface. Accordingly, there does not appear to be caller identification information provided in the voice mail notification itself. For example, U.S. Pat. No. 6,590,965, cited above, adapts a telephone network to supply name and number information to a voice mail system with a forwarded voice mail message.

Other messaging technologies, such as text messaging technologies, generally provide identification information on the sender in a notification when the message arrives and/or when viewing a list of messages. However, voice mail does not appear to support this capability. Rather, individuals generally receive some sort of notification that they have voice mail and, with some technologies, they are notified as to how many messages they have waiting.

FIG. 1 is a block diagram of voice mail systems, methods and devices 100, according to various embodiments of the present invention. As shown in FIG. 1, a voice mail server 110 provides voice mail services to a plurality of wireline telephones 130, 150, and/or wireless telephones 140, 160 via a network 120. The voice mail server 110 may include one or more enterprise, application, pervasive and/or personal computers that may be linked by a wired and/or wireless network. The network 120 may be a wired and/or wireless network including a circuit switched and/or packet switched wireline network and/or a wireless network that operates under one or more cellular/PCS protocols such as GSM and/or CDMA, and may also include a satellite communications network. The wireline telephones 130 and 150 may be conventional circuit switched or packet switched telephones that include voice mail capabilities, and the wireless telephones 140 and 160 also may be conventional cellular/PCS wireless telephones. The telephones may include a transmitter, receiver, user interface (including a display, microphone and speaker) and a controller. Any of the telephones 130-160 may also be multi-function devices with telephone capabilities. The design and operation of a voice mail server 100, network 120 and telephones 130, 140, 150, 160 as described in this paragraph are well known to those having skill in the art and need not be described in further detail herein.

Still continuing with the description of FIG. 1, according to some embodiments of the present invention, caller identification (caller ID) information 170 is transmitted from the voice mail server 110 to a telephone, such as telephone 130, in response to receiving a voice mail (VM) message 180 for the telephone 130 at the voice mail server 110, for example from telephone 160, and independent of receiving a request from the telephone 130 to access the voice mail server 110. As used herein, the term "originating telephone" (and variants thereof) may be used to refer to a telephone, such as telephone 160, that originates a voice mail message, such as voice mail message 180, and the term "destination telephone" (and variants thereof) may be used to refer to a telephone, such as telephone 130, that is the intended recipient of the voice mail message. The originating telephone 160 may also be referred to as a "1caller" or "calling" telephone (and variants thereof) and the destination telephone 130 may also be referred to as a "called" telephone (and variants thereof).

Accordingly, is illustrated in FIG. 1, caller identification information 170 is pushed from the voice mail server 110 to the destination telephone 130 upon receipt of a voice mail message 180 from the originating telephone 160 at the voice mail server 110. The caller ID information 170, or an identification of the caller based on the caller ID information, is therefore available at the destination telephone 130 before a request is made to access the voice mail server 110. Caller identification information 170 for the voice mail message 180 may thereby be provided as a notification that the voice mail message was received. The caller identification information 170 also may be provided independent of transmitting the voice mail message 190 from the server 110 to the destination telephone 130.

As also shown in FIG. 1, in response to a subsequent request from the destination telephone 130 to access the voice mail server 110, the actual voice mail message 190 is transmitted to the destination telephone 130 from the voice mail server 110. A caller identification may also be provided at the beginning of and/or during playback of the voice mail message. As is well known to those having skill in the art, the request from the destination telephone 130 may be a request to access the particular voice mail message 180 and/or a request to access all voice mail messages, and may be generated by selecting a voice mail icon, a displayed list of voice mail messages, a narrative message and/or using other techniques that will be described in detail below. As is well known to those having skill in the art, the caller ID information 170 may comprise a telephone number of the originating telephone 160 that is associated with the voice mail message 180.

Figure 2:
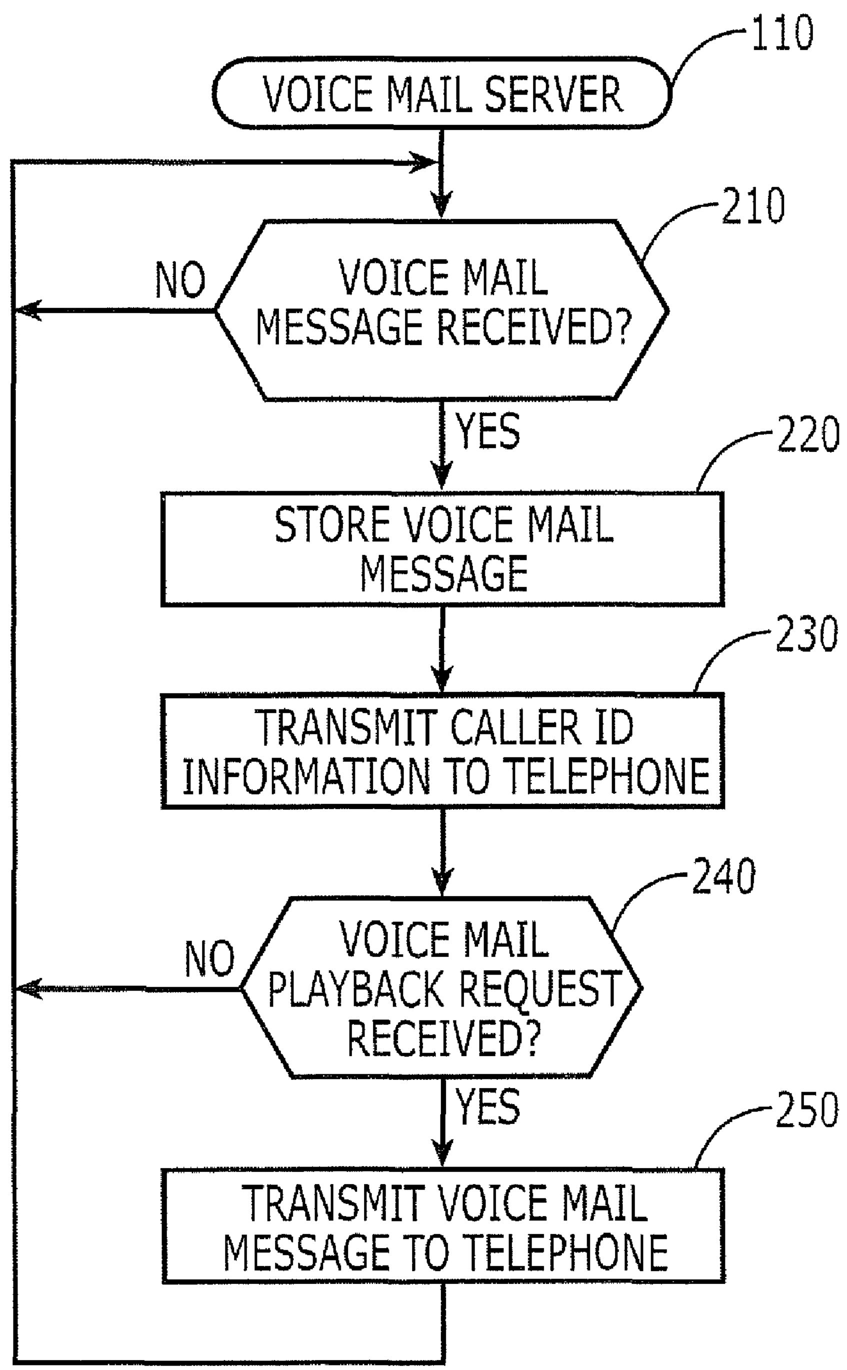
FIG. 2 is a flowchart of operations that may be performed by a voice mail server according to various embodiments of the present invention.

FIG. 2 is a flowchart of operations that may be performed by a voice mail server, such as a voice mail server 110 of FIG. 1, according to various embodiments of the present invention.

As shown in FIG. 2, at Block 210, in response to a voice mail message, such as a voice mail message 180, being received at the voice mail server 110 from originating telephone 160, the voice mail message is stored at Block 220 using conventional voice mail techniques. Caller identification information, such as the telephone number of the originating telephone 160, is also obtained using conventional voice mail techniques.

Continuing with the description of FIG. 2, at Block 230, the caller identification information 170 is transmitted to the destination telephone, such as the telephone 130 of FIG. 1. As shown at Block 230, this transmission takes place in response to receipt of the voice mail message 180 at the voice mail server 110, independent of receiving a request (Block 240) from the destination telephone 130 to access the voice mail server 110 to play the voice mail message 180 and/or independent of transmission of the voice mail message 190 itself from the voice mail server 110 to the destination telephone 130 (Block 250). A voice mail icon activation message and/or other notification message may also be transmitted by the voice mail server 110 to the destination telephone 130, in some embodiments. In other embodiments, however, the caller ID information may be transmitted at Block 230 instead of transmitting a voice mail icon activation message or other notification message.

Continuing with the description of FIG. 2, at Block 240, a voice mail playback request is received at the voice mail server 110 from the destination telephone 130. The voice mail playback request may be a request to play back all voice mail messages and/or a request to play the particular voice mail message 180. In response, the voice mail message 190 is transmitted from the voice mail server 110 to the destination telephone 130 at Block 250.

Many embodiments for transmitting the caller ID information from the voice mail server 110 to the destination telephone 130 (Block 230) may be provided according to various embodiments of the present invention. For example, some embodiments of the present invention may utilize a standards-based transmission, wherein an existing network standard is modified to allow transmission of the caller ID information from the voice mail server 110 to the destination telephone 130. Other embodiments may be implemented without the need for standardization. Many examples now will be provided, and other examples may be envisioned by those having skill in the art.

In particular, some embodiments may transmit the caller identification information from the voice mail server 110 to the destination telephone 130 by transmitting a text message such as a Short Message Service (SMS) message, a Wireless Application Protocol (WAP) push message and/or a Session Initiation Protocol (SIP) message from the voice mail server 110 to the destination telephone 130, in response to receiving a voice mail message 180 for the destination telephone 130 at the voice mail server 110, independent of receiving a request from the destination telephone 130 to access the voice mail server 110. The same technology may be used to subsequently transmit the voice mail message itself, according to some embodiments of the invention.

Figure 3:
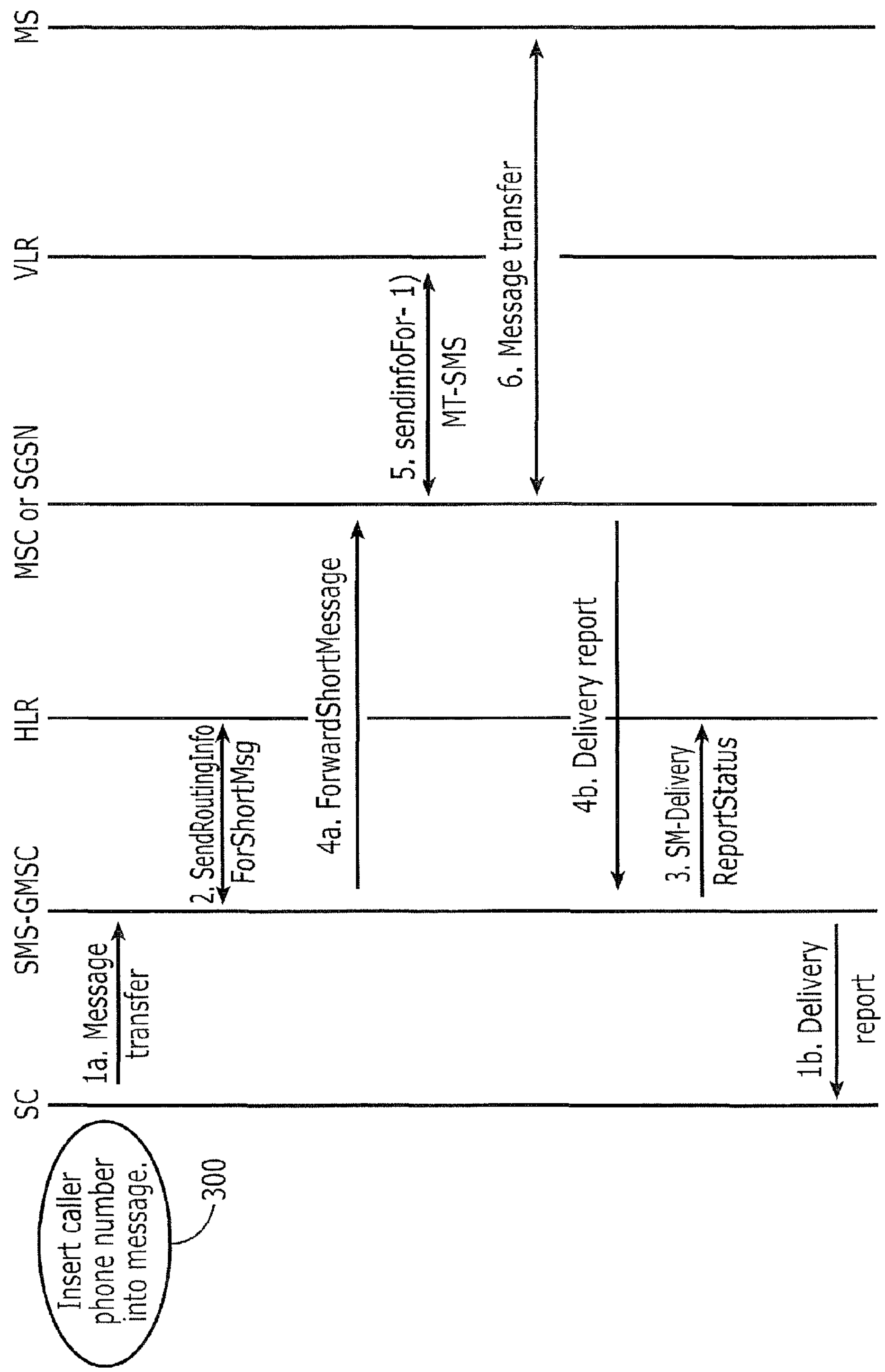
FIG. 3 illustrates a General System for Mobile Communications (GSM)/Short Message Service (SMS) message flow that may be used for voice mail notification according to various embodiments of the present invention.

For example, FIG. 3 illustrates a conventional voice mail notification message flow in the GSM system using SMS. As is well known to those having skill in the art, SMS for the GSM system is described in the specification GSM 03.40 V7.1.0 (1998-11) entitled *Digital cellular telecommunications system* (*Phase* 2+); *Technical realization of the Short Message Service* (*SMS*); *Point-to-Point* (*PP*). Reference DTS/SMG-040340Q7, referred to herein as the "GSM/SMS Specification", the disclosure of which is hereby incorporated herein by reference in its entirety as if set forth fully herein.

In particular, FIG. 3 is taken from FIG. 03.40/15a) of the GSM/SMS Specification and shows a conventional voice mail notification message that is sent from a Service Center (SC) to a Mobile Station (MS) via a Gateway Mobile-Service Switching Center for Short Message Service (SMS-GMSC), a Home Location Register (HLR), a Mobile-Services Switching Center (MSC) or a Serving GPRS Support Node (SGSN), and a Visitor Location Register (VLR). The detailed message flow of FIG. 3 is well known to those having skill in the art and need not be described further herein.

Still referring to FIG. 3, according to some embodiments of the present invention, at Block 300, the caller identification information, such as the caller phone number, is inserted into an SMS message that provides voice mail notification. A particular message into which the caller phone number may be inserted is described in Section 9.2.3.24 of the GSM/SMS specification. More specifically, the caller identification information, such as the caller phone number of Block 300, may be inserted into the "SM (7 bit data)" or the "SM (8 bit data or USC-2 data)" field in this message. The inserted caller identification information is then transferred to the destination telephone using GSM/SMS protocol as illustrated in FIG. 3.

As was described above, the caller ID information 170 may be transmitted to the destination telephone at Block 230, instead of transmitting a voice mail notification message that causes an icon or other general voice mail notification to appear at the destination telephone 130. Alternatively, this caller ID message may be sent in addition to the standard voice mail message that causes the voice mail icon or general voice mail message to appear. The GSM message that causes a voice mail icon to appear is referred to as a "TP-Data Coding Scheme" message, that is mentioned in Section 9.2.3.10 of the GSM/SMS Specification. Section 9.2.3.10 of the GSM/SMS Specification refers to the specification GSM 03.38 V7.1.0 (1999-03) entitled *Digital cellular telecommunications system* (*Phase* 2+); *Alphabets and language-specific information*, which indicates, at Section 4, the two bits that are set to indicate voice mail (Voicemail Message Waiting bits). Accordingly, the GSM/SMS standard may be used to transmit caller ID information 170 to the destination telephone 130 independent of receiving a request from the destination telephone 130 to access the voice mail server 110 and/or independent of transmitting the voice mail message 190 itself from the voice mail server 110 to the destination telephone 130. Signaling that is analogous to that shown in FIG. 3 may also be provided for a CDMA network, or for a network operating on other standards. Thus, the originator (caller) information may be added by the infrastructure, and that information may be parsed and presented by the destination telephone, as will be described in more detail below.

Other techniques for transmitting the caller ID information 170 to the destination telephone 130, corresponding to Block 230 of FIG. 2, may be implemented without the need for standardization. In particular, rather than using standards-based notification techniques, the infrastructure may send a voice mail notification to the destination telephone in a proprietary fashion. The notification message may contain the caller identification information, such as the originator's telephone number. Three alternatives for the proprietary message to the device may be a specially encoded SMS message, a WAP push message or an SIP message. SIP messages may be particularly easy to adopt quickly, because SIP messages use IP Multimedia Subsystem (IMS) support, and IMS allows new services to be deployed quickly. Many other proprietary techniques may be envisioned by those having skill in the art, depending upon the system that is involved. In any of these embodiments, the caller identification information may be sent as part of a voice mail notification message, may be sent instead of a voice mail notification message or may be sent in addition to a voice mail notification message. Thus, a separate message to activate a voice mail icon need not be sent in some embodiments.

Figure 4:
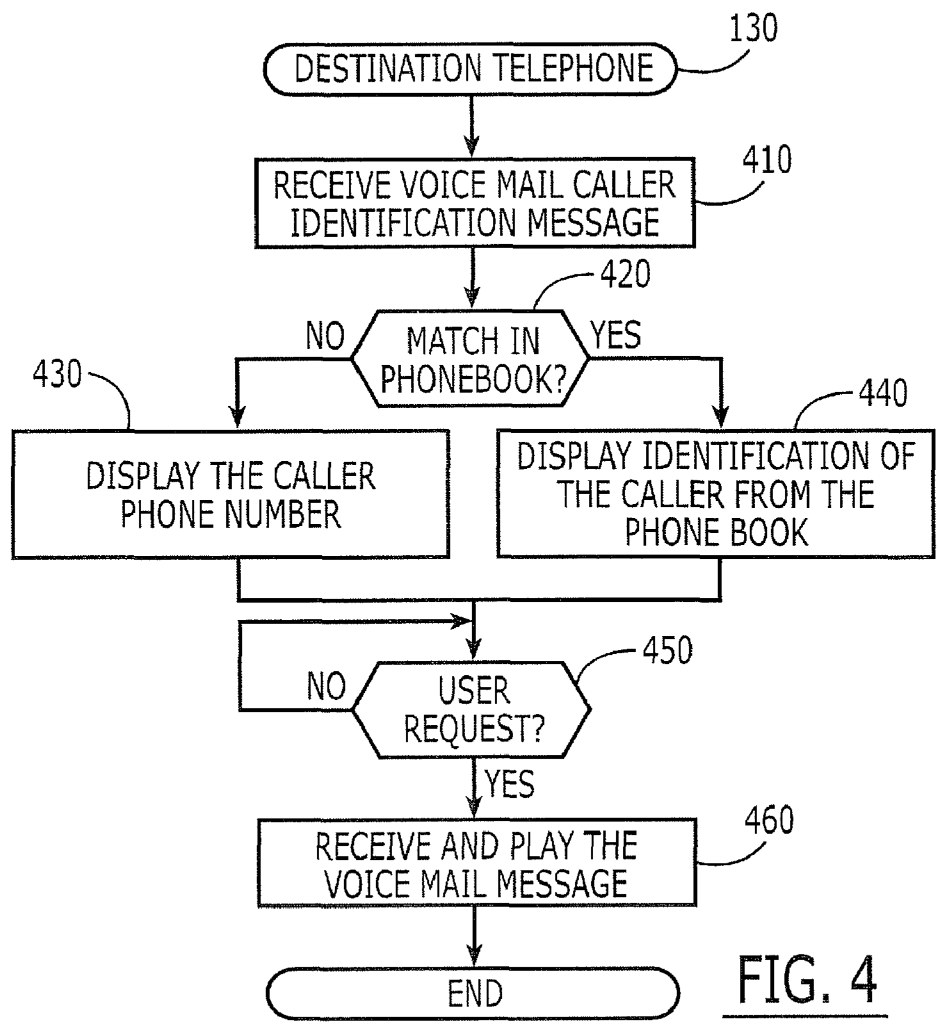
FIG. 4 is a flowchart of operations that may be performed by a telephone according to various embodiments of the invention.

FIG. 4 is a flowchart of operations that may be performed by a telephone, such as the destination telephone 130 of FIG. 1, according to some embodiments of the present invention. Referring to FIG. 4, at Block 410, a voice mail caller identification message, such as the caller information message 170 of FIG. 1, is received at the destination telephone 130 from the voice mail server 110. The voice mail caller identification message 170 may be received using any of the techniques that were described above in connection with FIGS. 2 or 3, or using any other techniques to transmit this message from the voice mail server 110 to the destination telephone 130. The voice mail caller identification message 170 is received at Block 410 independent of a request to access voice mail (Block 450) and/or independent of receipt of the voice mail message itself (Block 460).

Still referring to FIG. 4, at Block 420, a determination is made whether a match is found in the phone book for the destination telephone 130. Phone books are widely used in wired and wireless telephones, and may be stored locally in the telephone and/or in the communications network. Typically, phone books may be used to assist a user to make an outgoing call without the need to dial the complete phone number, and may also be used to provide caller identification for incoming calls. The design and use of a stored phone book are well known to those having skill in the art and need not be described further herein.

Continuing with the description of FIG. 4, if a match is found at Block 420, then at Block 440, the identification of the caller is displayed at the destination telephone 130. The identification of the caller may be a corresponding name, nickname, picture and/or any other conventional designation that is used to provide an identification of the caller, including display of the caller telephone number itself. In contrast, if a match is not found at Block 420, then at Block 430, the caller telephone number may itself be displayed. In yet another alternative, the caller telephone number may be unknown because, for example, the caller telephone is unlisted. In this case, no display may take place or a display indicating "Unknown Caller" or the like may be displayed.

Accordingly, when the voice mail caller identification message is received at Block 410, a phone book lookup can be performed at Block 420 on the originator's phone number contained in the message, so that the user at the destination telephone can be notified as to who originated the voice mail. For GSM/SMS systems, addition of the phone number to the SMS type of voice message waiting message may be performed by a voice mail gateway based upon the caller identification information available when the originator leaves the message. As was described above, the number itself can be presented if there is no associated name in the phone book. Moreover, if the originator requests that their number be hidden, the device can indicate that the voice mail is from an unknown caller.

Still referring to FIG. 4, at Block 450, upon user request and transmission of a message to the voice mail server 110, the voice mail message 190 is transmitted from the voice mail server 110 to the destination telephone 130 and is received and played at Block 460. It will be understood by those having skill in the art that user request of the voice mail may take place using conventional techniques for requesting and/or selecting a voice mail message for playback. For example, the identification of the caller may be selected, in which case the individual voice mail message may be played. Alternatively, a voice mail play function may be activated at the destination telephone to provide playback of all unread and/or undeleted voice mail messages. Voice mail playback is well known to those having skill in the art and need not be described further herein.

Many user interfaces may be provided for displaying the identification of the caller from the phone book (Block 440) or displaying a caller phone number itself (Block 430) according to various embodiments of the present invention. Other user interfaces that are commonly used to display caller identification for incoming or outgoing calls, text messages and/or other types of messages also may be provided.

Figures 5A, 5B, 5C:
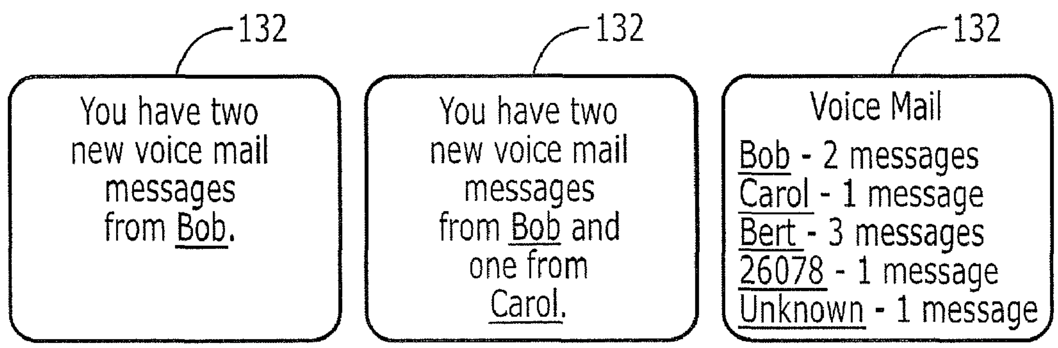
FIGS. 5A-5C illustrate user interfaces that may be displayed at a telephone to provide voice mail caller identification according to various embodiments of the present invention.

FIGS. 5A and 5B illustrate messages that may be displayed on a display 132 of the destination telephone 130 as a pop-up message and/or in response to selecting a voice mail icon. FIGS. 5A and 5B illustrate messages that are displayed in narrative form. FIG. 5A illustrates a narrative message for one or more voice mail messages from a single originating telephone, whereas FIG. 5B illustrates a narrative message for voice mail messages from multiple originating telephones. In FIGS. 5A and 5B, the identification of the caller (caller name) that was obtained from the phone book is displayed. The user may click on the identification of the caller to perform the user request of Block 450, and cause the voice mail message 190 to be transmitted to the destination telephone 130 from the voice mail server 110, and received/played at Block 460.

FIG. 5C illustrates a listing of messages from various originating telephones which may also appear as a pop-up message or in response to selection of, for example, a voice mail icon or other selection. Again, clicking on the caller causes the voice mail server to be accessed and the messages to be played. Other options for any of these displays may allow a user to select all of the voice mail messages for playback or a selected subset of the messages for playback using standard voice mail techniques.

Moreover, FIG. 5C illustrates display of an "Unknown" identification for unlisted or otherwise unidentifiable originating phone numbers. The originating phone number may be displayed when no match is found in the phone book, as shown in FIG. 5C by "26078". It will also be understood that the voice mail listing of FIG. 5C may be combined with a text messaging and/or other in-box, to provide a unified in-box based on the originator. The use of message in-boxes is well known to those having skill in the art and need not be described further herein.

Accordingly, some embodiments of the present invention provide a caller ID along with a voice mail notification, so that the identity of the caller(s) for one or more voice mails may be ascertained before accessing their voice mail. The user can thereby determine whether or when to play back a given voice mail and/or in which order to play multiple voice mails, based on the caller ID.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A voice mail enabled telephone comprising:

a receiver;

a display;

a user interface; and a controller that is configured to control the receiver to receive from a voice mail server, caller identification information for a voice mail message for the telephone independent of a request from the telephone to access the voice mail server, and to control the display to display an identification of the caller that is based upon the caller identification information;

wherein the controller is further configured to access a stored phone book at the telephone to determine if an identification of the caller is present that corresponds to the caller identification information for the voice mail message that was received, and to control the display to display a pop-up message including the identification of the caller if the identification of the caller is present, independent of input from the user interface; and wherein the controller is further configured to control the display to display a pop-up message including the caller identification information that was received if the identification of the caller is not present independent of input from the user interface.

2. A telephone according to claim 1 wherein the telephone is a wireless telephone.

3. A telephone according to claim 1 wherein the controller is further configured to control the receiver to receive the caller identification information for the voice mail message independent of transmission of the voice mail message from the voice mail server to the telephone.

4. A telephone according to claim 3 wherein the user interface further comprises a speaker, and wherein the controller is further configured to receive the voice mail message from the voice mail server and to play the voice mail message over the speaker in response to selection of the identification of the caller that is displayed or in response to selection of a voice mail play function.

5. A voice mail method comprising:

receiving at a telephone from a voice mail server, caller identification information for a voice mail message for the telephone independent of a request from the telephone to access the voice mail server;

accessing a stored phone book at the telephone to determine if an identification of the caller is present that corresponds to the caller identification information for the voice mail message that was received;

displaying at the telephone a pop-up message including the identification of the caller if the identification of the caller is present independent of input from a user interface at the telephone; and displaying at the telephone a pop-up message including the caller identification information that was received if the identification of the caller is not present independent of input from a user interface at the telephone.

6. A method according to claim 5 wherein the telephone is a wireless telephone.

7. A method according to claim 5 wherein receiving at a telephone from a voice mail server, caller identification information for a voice mail message for the telephone independent of a request from the telephone to access the voice mail server comprises receiving at the telephone from the voice mail server, caller identification information for the voice mail message for the telephone independent of a request from the telephone to access the voice mail server and independent of transmission of the voice mail message from the voice mail server to the telephone.

8. A method according to claim 7 further comprising:

transmitting the voice mail message from the voice mail server to the telephone in response to a request from the telephone and subsequent to receiving caller identification information for the voice mail message at the telephone from the voice mail server.

9. A voice mail enabled wireless telephone comprising:

a receiver;

a display;

a user interface comprising a speaker; and a controller that is configured to control the receiver to receive from a voice mail server, caller identification information for a voice mail message for the telephone independent of a request from the telephone to access the voice mail server and independent of transmission of the voice mail message from the voice mail server to the telephone, and to control the display to display an identification of the caller that is based upon the caller identification information;

wherein the controller is further configured to access a stored phone book at the telephone to determine if an identification of the caller is present that corresponds to the caller identification information for the voice mail message that was received, and to control the display to display a pop-up message including the identification of the caller if the identification of the caller is present, independent of input from the user interface;

wherein the controller is further configured to control the display to display a pop-up message including the caller identification information that was received if the identification of the caller is not present independent of input from the user interface; and wherein the controller is further configured to receive the voice mail message from the voice mail server and to play the voice mail message over the speaker in response to selection of the identification of the caller that is displayed or in response to selection of a voice mail play function.

10. A voice mail method comprising:

receiving at a wireless telephone from a voice mail server, caller identification information for a voice mail message for the telephone independent of a request from the telephone to access the voice mail server and independent of transmission of the voice mail message from the voice mail server to the telephone;

accessing a stored phone book at the telephone to determine if an identification of the caller is present that corresponds to the caller identification information for the voice mail message that was received;

displaying at the telephone a pop-up message including the identification of the caller if the identification of the caller is present independent of input from a user interface at the telephone;

displaying at the telephone a pop-up message including the caller identification information that was received if the identification of the caller is not present independent of input from a user interface at the telephone; and transmitting the voice mail message from the voice mail server to the telephone in response to a request from the telephone and subsequent to receiving caller identification information for the voice mail message at the wireless telephone from the voice mail server.

* * * * *

UNITED STATES PATENT AND TRADEMARK OFFICE

CERTIFICATE OF CORRECTION

PATENT NO. : 8,194,832 B2
APPLICATION NO. : 11/675709
DATED : June 5, 2012
INVENTOR(S) : Lohr It is certified that error appears in the above-identified patent and that said Letters Patent is hereby corrected as shown below:

In the Patent:

Column 6, Line 32: Please correct "to as a "1caller" or"
to read -- to as a "caller" or --

Signed and Sealed this
Eighth Day of January, 2013

David J. Kappos
*Director of the United States Patent and Trademark Office*